United States Patent [19]

De Filippo

[11] Patent Number: 5,733,009
[45] Date of Patent: Mar. 31, 1998

[54] HEADREST FOR MOTOR VEHICLE SEATS

[75] Inventor: Emilio De Filippo, Bruzolo, Italy

[73] Assignee: Gestind-M.B. "Manifattura di Bruzolo" S.p.A., Bruzolo, Italy

[21] Appl. No.: 758,771

[22] Filed: Dec. 3, 1996

[30] Foreign Application Priority Data

Jul. 16, 1996 [IT] Italy ............... TO96A0611

[51] Int. Cl.$^6$ ................................ A47C 7/36
[52] U.S. Cl. ........................... 297/391; 297/410
[58] Field of Search ..................... 297/391, 410

[56] References Cited

U.S. PATENT DOCUMENTS

| | | | |
|---|---|---|---|
| 3,512,832 | 5/1970 | Kage | 297/410 |
| 4,489,979 | 12/1984 | Zyngier | 297/391 |
| 4,678,232 | 7/1987 | Ishida et al. | 297/391 X |
| 4,779,929 | 10/1988 | Kuchemann | 297/391 X |
| 4,854,642 | 8/1989 | Vidwans et al. | 297/410 |
| 4,923,250 | 5/1990 | Hattori | 297/410 |
| 5,080,437 | 1/1992 | Pesta et al. | 297/410 |
| 5,590,929 | 1/1997 | Hamelin | 297/410 X |

FOREIGN PATENT DOCUMENTS 2240920  8/1991  United Kingdom ............ 297/410

*Primary Examiner*—Peter R. Brown
*Assistant Examiner*—Stephen Vu
*Attorney, Agent, or Firm*—Sughrue, Mion, Zinn, MacPeak & Seas, PLLC

[57] ABSTRACT

A headrest for motor vehicle seats, comprising a resilient body, a pair of parallel support rods projecting inferiorly from the resilient body, and a pair of tubular guide elements to be rigidly connected to the structure of a seat backrest for receiving the support rods. A rigid protection element is rigidly secured to the tubular guide elements and is to be fitted within the seat backrest to provide a rear shield of the support rods.

4 Claims, 3 Drawing Sheets

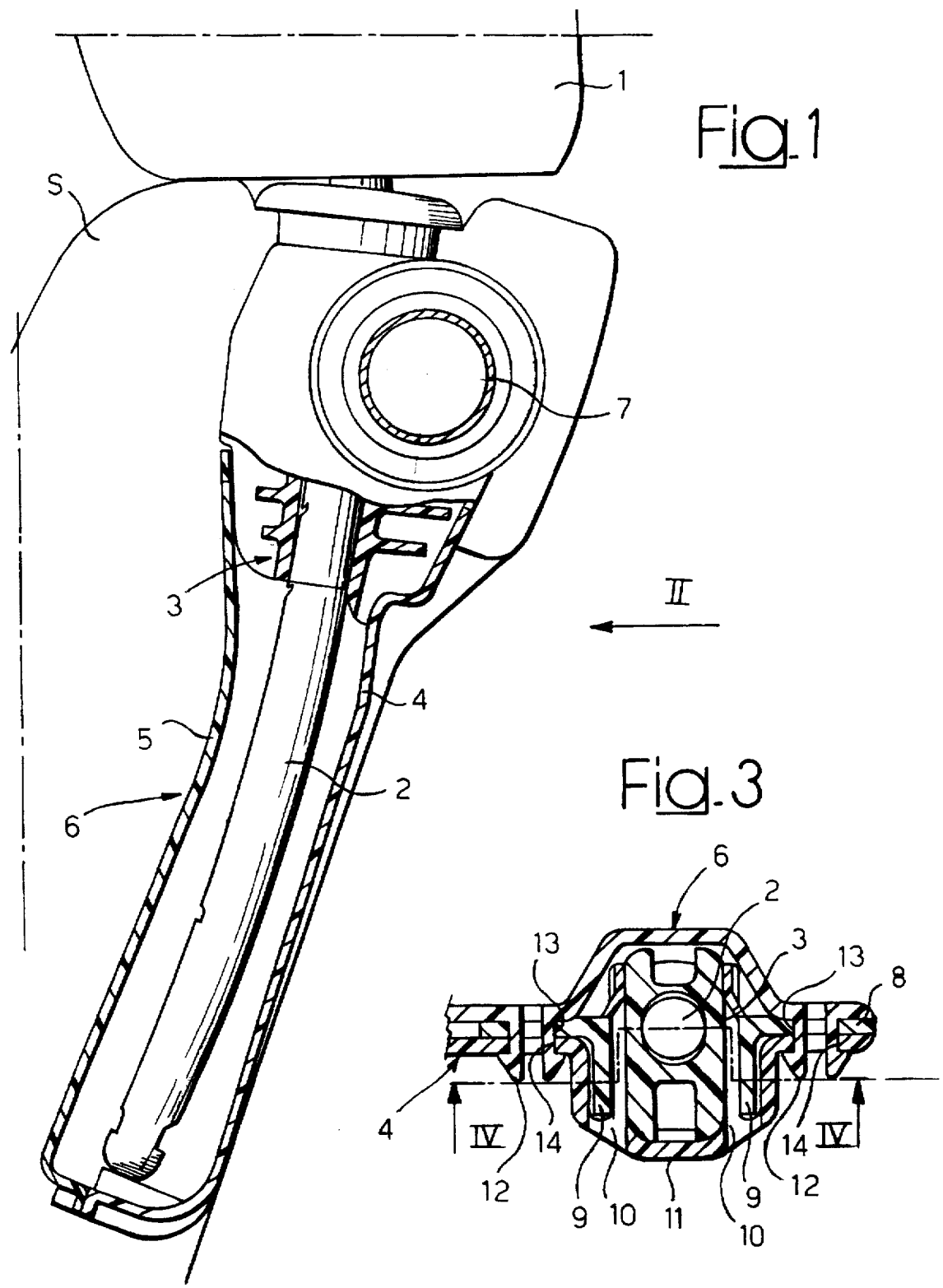

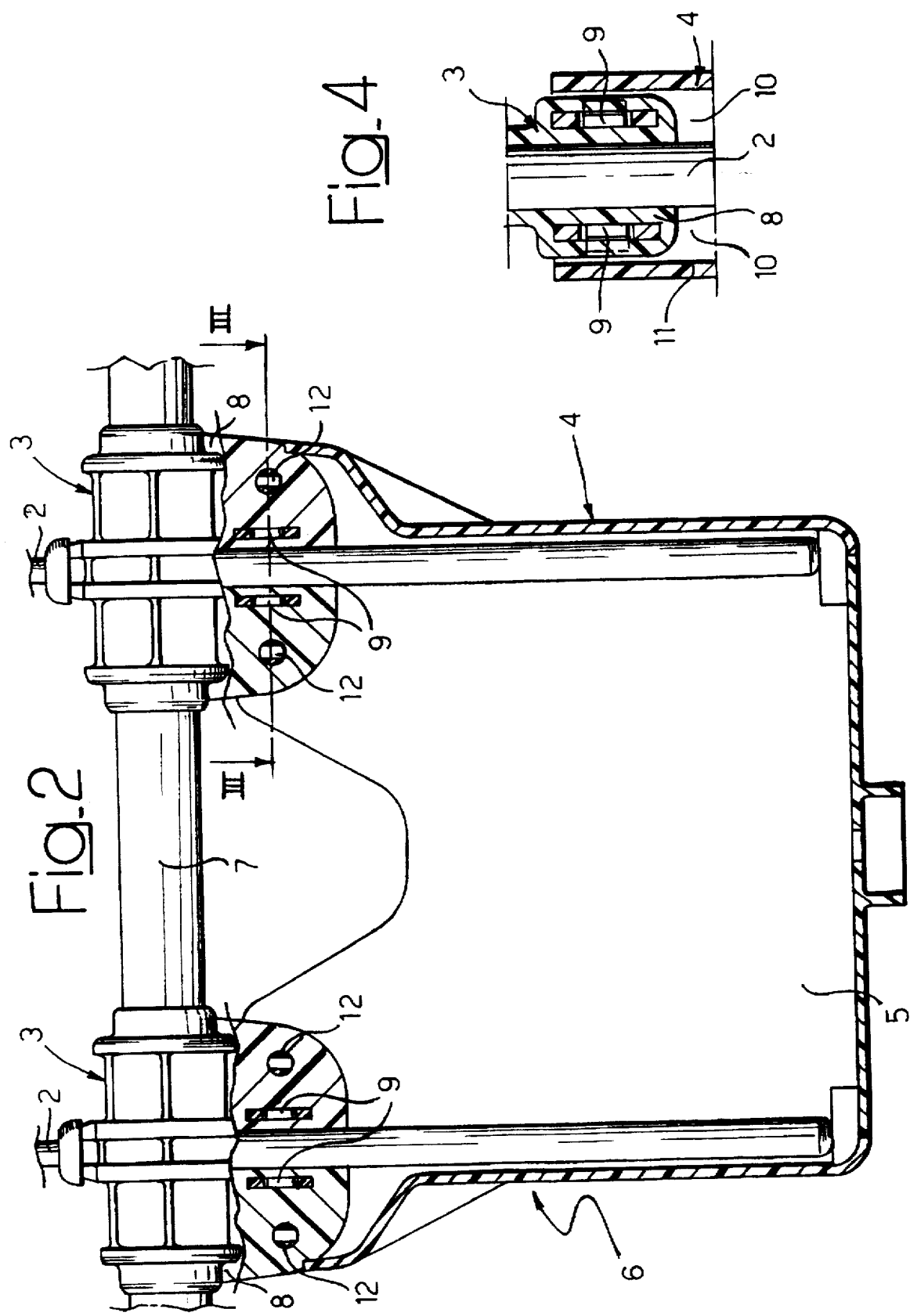

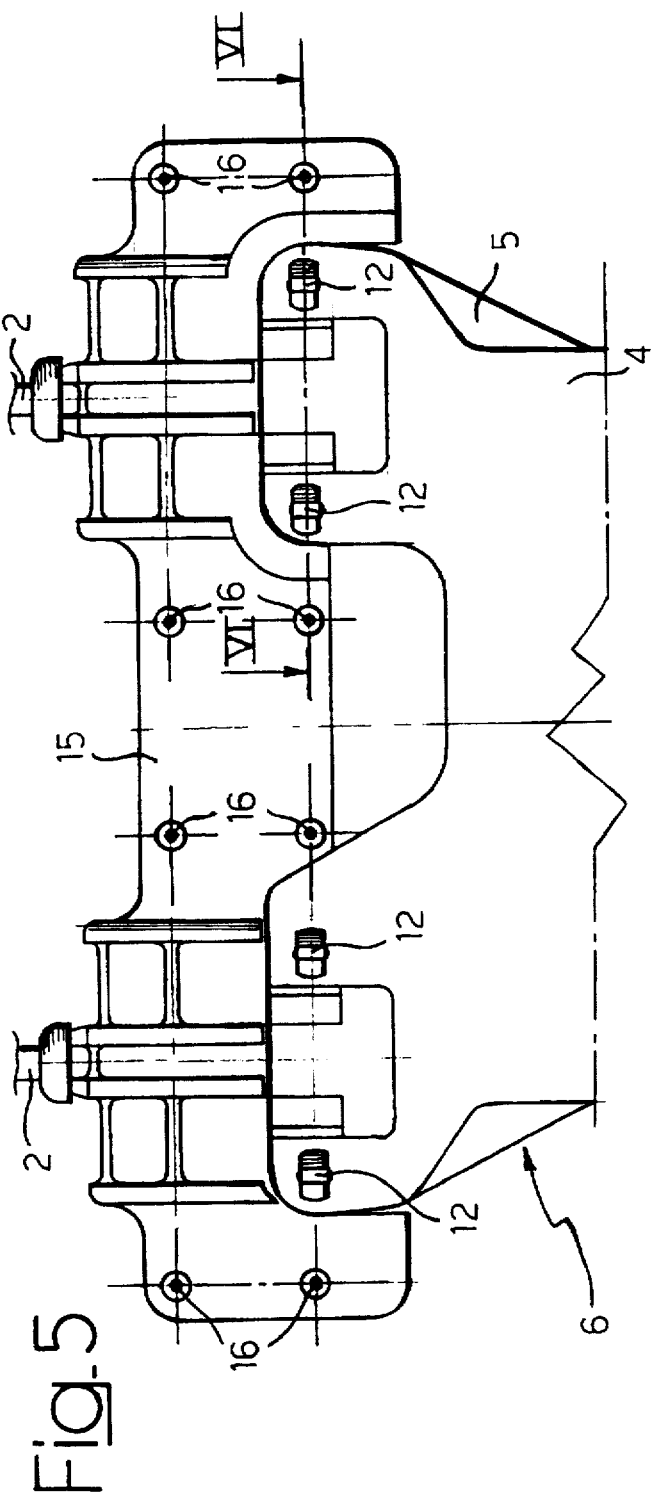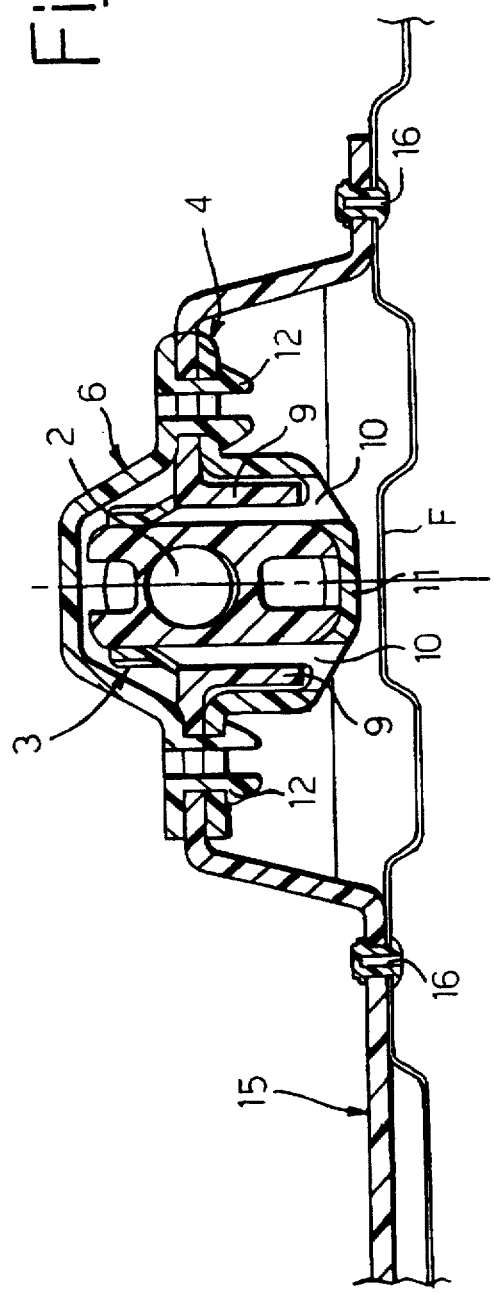

HEADREST FOR MOTOR VEHICLE SEATS

BACKGROUND OF THE INVENTION

The present invention relates to headrests for motor vehicle seats, comprising a resilient body, a pair of parallel support rods projecting inferiorly from the resilient body, and a pair of tubular guide elements to be rigidly secured to the structure of a seat backrest so as to receive said support rods therethrough.

In the headrests of the above-referenced type according to the prior art, such as disclosed and illustrated for instance in European patent EP-B0582765 in the name of the same Applicant, in the mounted condition of use the support rods freely extend inside the seat backrest, thus involving a serious danger for any passengers seated in the vehicle behind the seat on which the headrest is installed. Actually, in case of vehicle crash, an impact against the rear of the backrest may involve risks of traumas or injuries caused by the headrest support rods.

SUMMARY OF THE INVENTION

The object of the present invention is to overcome the above drawback, and more particularly to improve the headrest safety in connection with the above disclosed events.

According to the invention, this object is achieved essentially by virtue of the fact that the headrest further comprises a rigid protection element rigidly secured to said tubular guide elements and adapted to be fitted within the seat backrest so as to define a rear shield of said support rods.

According to a preferred embodiment of the invention, the headrest further comprises a front shield also secured to said tubular guide elements and forming with said rear protection element a box-like body housing the two support rods.

Said tubular guide elements of the support rods are conveniently formed by moulded plastic material bushes provided with respective integral attachment appendages, and said rear protection element and said front shield are formed by moulded plastic material half-shells joined to each other and to said attachment appendages of the two bushes by means of respective restrained-joint engagement members and snap-fit coupling members.

BRIEF DESCRIPTION OF THE DRAWINGS

The invention will now be disclosed in detail with reference to the accompanying drawings, purely provided by way of non-limiting example, in which:

FIG. 1 is a diagrammatic and partially vertically sectioned view of a headrest for motor vehicle seats according to the invention, FIG. 2 is a rear elevational and partially sectioned view according to arrow II of FIG. 1, FIG. 3 is a horizontally sectioned and enlarged view along line III—III of FIG. 2, FIG. 4 is a vertically sectioned view along line IV—IV of FIG. 3, FIG. 5 shows a variant of FIG. 2, and FIG. 6 is a horizontally sectioned and enlarged view along line VI—VI of FIG. 5.

DETAILED DESCRIPTION OF THE INVENTION

In the present description and in the following claims, the terms "front" and "rear" and the like are to be intended referred to the mounted condition of the headrest on the backrest S of the motor vehicle seat.

Referring initially to FIGS. 1 through 4, a headrest for motor vehicle seats essentially comprises a resilient body or pillow 1, normally made of foamed plastic material and incorporating a supporting framework not shown in the drawings, since generally conventional, which in turn is rigidly or tiltably and/or slidably connected to a pair of parallel support rods 2 projecting downwardly from the base of the resilient body 1. In the mounted condition of the headrest, the resilient body 1 is located in a fixed or in a height adjustable way on top of the backrest S of a motor vehicle seat, and the support rods 2 extend into the backrest S, being fitted (in a stationary or slidable way) through a pair of tubular guide elements constituted by moulded plastic material bushes, generally designated as 3. These bushes 3 are directly overmoulded, upon forming thereof, on a metal mounting bar 7, intended to constitute the upper transverse member of the structure of the seat backrest S. Accordingly the necessary precision in the mutual positioning between the two bushes 3, and in particular perfect parallelism and precise mutual spacing for introducing and possibly sliding of the support rods 2, is warranted in an absolute way.

According to the invention, a rigid protection element 4 is rigidly secured to the two bushes 3, in the way which shall be clarified here below, which is constituted by a moulded plastic material half-shell, adapted to be housed within the seat backrest S so as to provide a rear shield the function of which is to protect, in use, the legs of the vehicle passengers seated behind the backrest S against risks of traumas or injuries caused by any contact or impact against the support rods 2, following deformation of the backrest S in case of crash.

Reference numeral 5 designates a front half-shell, also made of moulded plastic material and also secured in the way clarified here below to the two bushes 3, so as to form, together with the rear protection element 4, a closed box-like body 6 into which the support rods 2 extend.

Referring in better detail to FIGS. 3 and 4, the two bushes 3 are formed with respective lower integral appendages 8 and rear wings 9 engaging, by means of restrained joins, corresponding recesses 10 formed in correspondence of respective projecting portions 11 of the rear protection element 4. The front shield 6 is connected to the rear protection element 4 through integral snap-fit coupling pins 12 fitted through corresponding apertures 13 of the appendages 8 of the two bushes 3 and corresponding holes 14 of the rear protection element 4.

The variant shown in FIGS. 5 and 6 differs from the above disclosed embodiment in that the two bushes 3, instead of being overmoulded on the mounting bar 7, are jointly moulded with an integral connection plate 15, also made of moulded plastic material. According to this variant, in which parts which are identical or similar to those already previously disclosed are designated by the same reference numerals, the connecting plate 15 is provided with connecting members 16 for rigid attachment thereof to the structure, indicated as F in FIG. 6, of the seat backrest S. In this variant the rear protection element 4 and the front shield 5 forming the box-like body 6 are secured to the two bushes 3, and thus to the connecting plate 15, in the same way as previously disclosed, such as shown in detail in FIG. 6.

Naturally the details of construction and the embodiments may be widely varied, with respect to what has been disclosed and illustrated, without thereby departing from the scope of the present invention, such as defined in the appended claims.

What is claimed:

1. A headrest for a motor vehicle seat having a backrest with a bearing structure, comprising a resilient body, a pair of parallel support rods projecting inferiorly from the resilient body, and a pair of tubular guide elements adapted to be rigidly secured to said structure of the seat backrest so as to receive said support rods therethrough, and further comprising a rigid protection element rigidly secured to said tubular guide elements and defining a rear shield partially enclosing lower ends of said support rods:

wherein a front shield also connected to said tubular guide elements and forming with said rear protection element a single hollow body completely enclosing both said lower ends of both said support rods.

2. The headrest according to claim 1, wherein said tubular guide elements are formed by moulded plastic material bushes provided with respective integral attachment appendages and said rear protection element and said front shield are formed by moulded plastic material half-shells joined to each other and to said attachment appendages of said two bushes by snap-fit coupling members.

3. Headrest according to claim 2, wherein said two bushes are overmoulded on a mounting bar, said mounting bar being adapted to define an upper transverse member of said backrest structure.

4. The headrest according to claim 2, further comprising a plastic material connecting plate member integrally moulded with said two bushes, and rigid fixing means for securing said connecting plate to said backrest structure.

* * * * *